United States Patent Office 3,012,033
Patented Dec. 5, 1961

3,012,033
NEW SUBSTITUTED PHTHALAZINES AND PROCESS FOR THEIR PREPARATION
Heinz-Joachim Engelbrecht, Dessau, Dieter Lenke, Rodleben, and Hildegard Müller, Dessau, Germany, assignors to VEB Deutsches Hydrierwerk Rodleben, Rodleben, Germany
No Drawing. Filed July 23, 1958, Ser. No. 750,303
Claims priority, application Germany Aug. 15, 1957
13 Claims. (Cl. 260—250)

The present invention relates to certain basically substituted phthalazines of the general formula

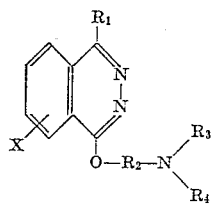

and to a process for their preparation. In this formula $R_1$ is an aryl or aralkyl group which, if desired, may be substituted in the nucleus, $R_2$ is bivalent straight or branched aliphatic chain with at least 2 and at the most 5 carbon atoms; $R_3$ and $R_4$ are low molecular alkyl groups which may be closed to form a heterocyclic ring; and X is hydrogen or halogen. More particularly, $R_1$ is an aryl or aralkyl radical which may contain up to 4 rings in the nucleus (preferably monocyclic or bicyclic) and which may contain a variety of substituents, such as alkyl, halogen, hydroxy or alkoxy, etc.; $R_2$ is a bivalent straight or branched chain aliphatic hydrocarbon group containing from 2 to 5 carbon atoms; and $R_3$ and $R_4$ are monovalent or divalent aliphatic hydrocarbon groups, divalent ether linked aliphatic hydrocarbon radicals or divalent nitrogen linked aliphatic hydrocarbon radicals, wherein when $R_3$ and $R_4$ are divalent radicals they are joined at their terminal ends to form a heterocyclic nucleus.

The new compounds are obtained in accordance with this invention by reacting phthalazines which are halogenated in 1-position of the general formula

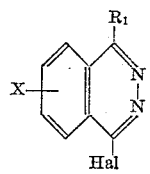

with tertiary amino alcohols of the formula

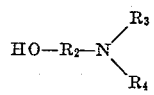

preferably in the form of their alkali metal compounds. In these formulae Hal is a halogen atom while $R_1$ to $R_4$ have the meaning given above.

The following phathalazine derivatives may be used as starting material for the present process: 1-chloro-4-phenyl-phthalazine, 1 - brom-4-m-cresyl-phthalazine, 1-chlor-4α-naphthyl-phthalazine, 1-chlor - 4-benzyl-phthalazine, 1-chlor-4-benzyl-6(7) - chlorphthalazine, 1-chlor-4-p-brombenzyl - phthalazine, 1-brom-4-o-methoxybenzyl-phthalazine, 1-chlor-4-p-isopropoxy-benzyl-phthalazine.

The following amino alcohols may be used in the process of this invention: dimethylaminoethanol, diethylaminoethanol, piperidinoethanol, morpholinoethanol, 1-dimethylaminopropanol - (3), 1-dimethylaminopropanol-(2), 1-methylethylaminobutanol-(3).

In accordance with the present invention the halogenated phthalazine, in equimolecular amounts (calulated on alkali metal) is caused to react, for example, with a solution of an alkali metal in excess of amino alcohol, while stirring and cooling, whereafter the reaction is completed by heating for several hours at the boiling temperature of the amino alcohol.

However, one may also proceed in such a manner that the amino alcohol, in the presence of an organic solvent which is immiscible with water (e.g., benzene, toluene or xylene) is treated in ordinary manner with an equimolecular amount of an alkali metal amide, preferably sodium amide, whereafter upon completion of the ammonia evolution at the boiling temperature of the solvent, one reacts with the halogenated phthalazine.

The further working-up of the reaction products is carried out in the usual manner, for example, by washing the reaction solution with water or by extracting same with a solvent which is immiscible with water (e.g., ether or benzene) and washing of the solution with water. The products are recovered either by distillation in vacuo or by converting them into suitable salts. The free bases may also be quaternized in the usual manner.

The phthalazine derivatives which are used as starting materials, may be obtained by known processes, for example, by treating phthalazines which are aralkyl substituted or aryl substituted in 4-position, with phosphorous oxychloride. The phthalazones proper which are substituted in 4-position, may also be obtained by known methods, for example, by condensation of hydrazine with o-benzoyl-benzoic acid, m-toluyl-o-benzoic acid, benzalphthalide, p - chlorbenzalphthalide, p - methoxybenzalphthalide, or naphthobenzalphthalide.

The compounds of the present invention are valuable medicinals which have not been previously described in the literature. The only compounds which are known are the basically substituted bis-alkyl ether of pyridazine (Helv. Chim. Act., 37 (1954), 121 et seq.), as well as basically substituted monoethers of phthalazone (1-oxo-1,2-dihydrophthalazine) which in addition are basically substituted at the amide nitrogen (German Auslegeschrift 1,005,072).

The known compounds of which the last mentioned has analgesic, antipyretic and antiphlogistic action, are considerably different from the compounds which are obtainable by the present process, both with regard to their chemical constitution and their pharmacological characteristics. It has been found that the new compounds, in contrast with the mentioned known compounds, primarily excel in their histaminolytic spasmolytic and local anaesthetic action, with especially strong, specific and long lasting antihistaminic action. With regard to the known similarly acting compounds, our new compounds are considerably different in their constitution, and thus constitute a new type of highly active antihistamines. They are also useful in the preparation of penicillin salts having a lasting effect.

The following examples are further illustrative of the present invention and it will be understood that the invention is not limited thereto.

*Example 1*

A solution consisting of 1.2 parts by weight of metallic sodium, 15 parts by weight of β-diethylaminoethylalcohol and 50 parts by volume of toluene is gradually admixed at a temperature of 10° C., under stirring, with 12.8 parts by weight of 1-chlor-4-benzylphthalazine (having a melting point of 152° C.). The last mentioned compound was obtained by heating 4-benzylphthalazone-(1) with phosphoroxychloride. Thereafter the temperature is raised to boiling and subsequently the stirring is continued for several hours at this boiling temperature. Upon cooling one washes with water and the toluene layer is dried. Upon distilling the toluene, 14 parts by weight of 1-(β-diethylaminoethoxy)-4-benzyl-phthalazine are obtained having a boiling point at 0.5 mm. Hg of 226° to 233° C. The hydrochloride of this compound melts at a temperature of 131° to 132° C. The benzchloride of this base melts at 169° to 170° C.

In analogous manner, from 35 parts by weight of β-diethylaminoethanol, 3.1 parts by weight of metallic sodium, 150 parts by volume of toluene and 32 parts by weight of 1-chlor-4-phenyl-phthalazine one obtains 32.1 parts by weight of 1-(β-diethylaminoethoxy)-4-phenyl-phthalazine (boiling point 229° to 233° C. at 0.5 mm. Hg). The hydrochloride of this compound melts at 202° C. The compound 1-chlor-4-phenyl-phthalazine (F. 159–161° C.) was prepared by heating 4-phenylphthalazone-(1) with phosphoroxychloride.

*Example 2*

8.9 parts by weight of β-dimethylaminoethylalcohol, dissolved in 75 parts by volume of xylene, were stirred with 4 parts by weight of sodamide and heated on a water bath until no more ammonia was evolved. After cooling to about 10° C., 25.5 parts by weight of 1-chlor-4-benzyl-phthalazine were gradually added and the mixture was heated several hours at about 140° C. Thereafter sodium chloride was filtered off under suction and the xylene solution was washed with water. After distillation of the solvent there remained behind 25.8 parts by weight of 1-(β-dimethylaminoethoxy)-4-benzyl-phthalazine (boiling point 201°–208° C. at 0.5 mm. Hg), whose hydrochloride melts at 178° C. The methiodide of the base has a melting point of 186° C.

In an analogous manner, from β-piperidinoethylalcohol and 1-bromo-4-p-chlorobenzyl-phthalazine [prepared by heating 4-p-chlorobenzyl-phthalazone-(1) with phosphorus pentabromide] 1-(β-piperidinoethoxy)-4-p-chlorobenzyl-phthalazine is obtained, whose hydrochloride melts at 165–166° C.

*Example 3*

1.3 parts by weight of metallic sodium was dissolved in 50 parts by weight of 1-dimethylaminopropanol(3). To this solution, at a temperature of 10°–15° C., was added 14 parts by weight of 1-chlor-4-benzylphthalazine. Thereafter the solution was heated several hours at a temperature of about 150° C. The reaction product was taken up in ether, the solution filtered, washed with water and then dried. After distillation of the ether, 12.9 parts by weight of 1-(3'-dimethylaminopropoxy)-4-benzyl-phthalazine (boiling point 220°–225° C. at 0.4 mm. Hg) was obtained, whose hydrochloride melts at 170°–171° C. The methiodide of this base has a melting point of 211° C.

In an analogous manner, from 1-dimethylaminopropanol-(2) and 1-chlor-4-p-methoxy-benzyl-phthalazine, the 1-(2'-dimethylaminopropoxy)-4-p-methoxybenzyl-phthalazine (boiling point 224°–230° C. at 0.6 mm. Hg) is obtained.

*Example 4*

2.3 parts by weight of metallic sodium were brought into solution in a mixture consisting of 20 parts by weight of β-dimethylaminoethyl alcohol and 100 parts by volume of toluene. To this was gradually added with cooling to about +10° C. and stirring, 30 parts by weight of 1-chlor-4-p-methoxybenzyl-phthalazine [prepared by heating 4-p-methoxybenzyl-phthalazone-(1) (F. 196° C.) with phosphorus oxychloride]. Afterwards the reaction mixture was heated to boiling for several hours. After cooling, it was washed with water and the toluene layer was dried. After distillation of the toluene 21.3 parts by weight of 1-(β-dimethylaminoethoxy)-4-p-methoxybenzyl-phthalazine (boiling point 219°–226° C. at 0.15 mm. Hg) was obtained.

In an analogous manner, from 50 parts by weight of β-dimethylaminoethylalcohol, 1.2 parts by weight of metallic sodium and 18 parts by weight of 1-bromo-4-p-chlorobenzyl-phthalazine [prepared by heating 4-p-chlorobenzyl-phthalazone-(1) (F. 218° C.) and phosphorus pentabromide] 14.5 parts by weight of 1-(β-dimethylaminoethoxy)-4-p-chlorobenzyl-phthalazine (boiling point 218°–222° C. at 0.3 mm. Hg) are obtained, whose hydrochloride melts at 239°–240° C.

While the invention has been described with particular reference to specific embodiments, it is to be understood that it is not limited thereto, but is to be construed broadly and restricted solely by the scope of the appended claims.

What is claimed is:

1. As a composition of matter a phthalazine of formula

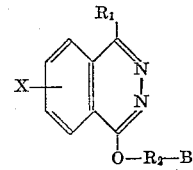

wherein $R_1$ is selected from the group consisting of phenyl, m-cresyl, α-naphthyl, benzyl, p-chlorobenzyl, p-bromobenzyl, o-methoxybenzyl and p-isopropoxybenzyl; X is selected from the group consisting of hydrogen and chlorine; $R_2$ is the bivalent alkylene radical of from 2 to 5 carbon atoms and B is selected from the group consisting of lower dialkylamino, piperidino and morpholino.

2. As a composition of matter the hydrochloride salts of compounds of claim 1.

3. As a composition of matter the methiodide salt of 1-(β-dimethylaminoethoxy)-4-benzyl-phthalazine.

4. As a composition of matter the methiodide salt of 1-(3'-dimethylaminopropoxy)-4-benzyl-phthalazine.

5. As a composition of matter the benzylchloride of 1-(β-diethylaminoethoxy)-4-benzyl-phthalazine.

6. 1-(β-diethylaminoethoxy)-4-benzyl-phthalazine.

7. 1-(β-diethylaminoethoxy)-4-phenyl-phthalazine.

8. 1-(β-dimethylaminoethoxy)-4-benzyl-phthalazine.

9. 1-(β-piperidinoethoxy)-4-p-chlorobenzyl-phthalazine.

10. 1-(3'-dimethylaminopropoxy)-4-benzyl-phthalazine.

11. 1-(2'-dimethylaminopropoxy)-4-p-methoxybenzyl-phthalazine.

12. 1-(β-dimethylaminoethoxy)-4-p-methoxybenzyl-phthalazine.

13. 1-(β-dimethylaminoethoxy)-4-p-chlorobenzyl-phthalazine.

References Cited in the file of this patent

UNITED STATES PATENTS

| | | |
|---|---|---|
| 2,566,376 | Shelton | Sept. 4, 1951 |
| 2,642,437 | Clinton | June 16, 1953 |
| 2,736,727 | Fourneau | Feb. 28, 1956 |
| 2,744,139 | Binkley | May 1, 1956 |
| 2,748,116 | Cusic | May 29, 1956 |
| 2,838,510 | Suter | June 10, 1958 |

OTHER REFERENCES

Simpson: The Chemistry of Heterocyclic Compounds, pages 84–5 (1953).

Fieser: Organic Chemistry, 3rd ed., page 136 (1956).

Fieser: Organic Chemistry, 3rd ed., pages 224–8 (1956).

Winthrop et al.: Can. J Chem., vol. 34, pages 1557–61 (1956).

Marly: Chem. Abst., vol. 51, column 1305 (1957), (abstract of Belgium Patent 490,069, Nov. 1, 1949).